United States Patent [19]

Gundlach

[11] 4,210,080
[45] Jul. 1, 1980

[54] IMAGING METHOD AND APPARATUS

[75] Inventor: Robert W. Gundlach, Victor, N.Y.

[73] Assignee: Xerox Corporation, Stamford, Conn.

[21] Appl. No.: 873,296

[22] Filed: Jan. 30, 1978

[51] Int. Cl.² ............................................. G01D 5/44
[52] U.S. Cl. ...................................... 101/426; 101/1;
 101/DIG. 13; 101/129; 101/114; 355/3 TE
[58] Field of Search ............... 101/426, 1 R, DIG. 13,
 101/129, 114, 116, 122, 127; 346/153, 140 R;
 355/3 R, 3 SC, 3 TE, 3 TR; 118/621, 623, 650

[56] References Cited

U.S. PATENT DOCUMENTS

| | | | |
|---|---|---|---|
| 3,096,198 | 7/1963 | Schaffert | 101/DIG. 13 |
| 3,401,628 | 9/1968 | Fredrickson | 101/129 |
| 3,582,954 | 6/1971 | Skala | 101/1 X |
| 3,665,851 | 5/1972 | Edwards et al. | 101/DIG. 13 |
| 3,738,266 | 6/1973 | Maeda et al. | 101/DIG. 13 |
| 3,776,630 | 12/1973 | Ohno et al. | 118/650 |
| 3,809,556 | 5/1974 | Pressman et al. | 101/114 X |
| 3,834,301 | 9/1974 | Croquelois et al. | 101/DIG. 13 |
| 3,839,027 | 10/1974 | Pressman | 101/DIG. 13 |
| 3,924,943 | 12/1975 | Fletcher | 355/3 TR |
| 3,977,323 | 8/1976 | Pressman et al. | 101/114 X |
| 3,995,729 | 12/1976 | Anton et al. | 101/DIG. 13 |
| 4,021,106 | 5/1977 | Gaynor | 101/DIG. 13 X |
| 4,055,380 | 10/1977 | Borostyan | 355/3 TR |
| 4,088,891 | 5/1978 | Smith et al. | 101/DIG. 13 |
| 4,105,444 | 8/1978 | Shinohara et al. | 355/3 SC X |
| 4,164,746 | 8/1979 | Anselrode | 346/140 R |

*Primary Examiner*—E. H. Eickholt
*Attorney, Agent, or Firm*—James J. Ralabate; Peter P. Eichler; Eugene O. Palazzo

[57] ABSTRACT

Liquid ink is held in the openings of a screen which is placed adjacent a grounded conductive surface. Electrical charge is delivered to selected ones of the openings so that the charged ink is drawn to the grounded conductive surface by the attractive forces therebetween. The ink can then be transferred to a record medium in image configuration.

23 Claims, 5 Drawing Figures

IMAGING METHOD AND APPARATUS

BACKGROUND OF THE INVENTION

This invention relates generally to recording methods and apparatus; and, more specifically, to such methods and apparatus which utilize liquid ink as a marking medium.

The advantages of liquid ink recorders are well known. One advantage is the ability to mark on low cost recording media, such as paper. Another advantage is the instantaneous display of the ink markings on the recording media.

However, most such recorders are basically mechanical in nature and have certain limitations on speed of recording.

One type of prior art ink recorder employs a retractable ink-fed stylus which deposits ink only during contact with the recording medium. This contact is controlled by electrical information signals and is not generally useful in high speed operation.

Continuous contact recorders wherein ink is deposited only during relative movement between the stylus and the recording medium are generally limited in applicability to situations where oscillographic traces are to be recorded.

Other recorders utilize a plurality of capillary-fed styli to supply ink near to the recording surface. Flow to the recording surface is effected by electrical signals applied between a particular stylus or group of styli and a conductive backing electrode which lies in the entire recording zone behind the recording medium. This usually results in a capacitive buildup of charges on the styli which causes erratic operation.

Ink recorders as described in U.S. Pat. Nos. 3,289,211 and 3,375,528, assigned to the same assignee as the instant application, eliminate many of the speed limiting factors. However, these recorders employ a recording head which deposits ink in unitary, integral amounts and must be moved physically across the recording medium in order to record an entire line of information. This operation makes high speed recording difficult.

Still other liquid ink recorders operate on the ink jet principle wherein droplets of liquid ink are jetted from an orifice and directed to a recording surface, such as paper. In some ink jet systems, the droplets are ejected from the orifice by pressure. In other ink jet systems, the ink is drawn from the orifice by an electric field. In still other ink jet systems, a stream of liquid ink flowing from a nozzle is broken into droplets by vibrations.

The droplets can be charged and then selectively electrically deflected away from the recording surface or to a different point on the recording surface. Controlling the droplets so as to make the desired markings on the recording surface requires sophisticated and oftentimes complicated controls. A more direct method of marking on a recording surface is desirable.

U.S. Pat. No. 3,738,266, Maeda et al, describes an electronic printing device wherein ink is held in a finely-meshed screen of dielectric material. The ink is charged to one polarity, and the screen is brought adjacent a recording surface, such as paper. The other side of the recording surface is then imagewise charged with an electrostatic printing tube.

The field between the charges is sufficiently strong to cause the ink within the field to move from the screen and to cling to the recording surface. The method of Maeda et al requires placing charges of one polarity on one side of the recording material while the charged ink is on the other side of the material. Because of the thickness of the recording material, a relatively high potential is needed, requiring biased rollers and the like. A method for direct marking while avoiding the use of high potentials is desirable. A still greater disadvantage of Maeda is the loss of image sharpness inherent in applying the signal information charges to the side of the recording material opposite the ink applicator.

PRIOR ART STATEMENT

The following list is provided in compliance with 37 CFR 1.97 and is believed to include the closest prior art relating to the invention described below:

1. U.S. Pat. No. 3,738,266 to Maeda et al. discloses a means for transferring an electrically insulating printing ink from an insulating screen to a recording medium, such as paper. As shown in FIG. 1, the ink in selected chambers of the screen is charged to one polarity. A recording medium is placed between the screen and a bias roller. The bias roller is maintained at a high potential of the opposite polarity. The field across the recording medium draws the charged ink to the recording medium.

In the embodiment shown in FIG. 2, the inked screen is uniformly charged to one polarity and charges of the opposite polarity are placed on the back side of the recording medium. The ink is drawn to the recording medium by the attraction between the charges across the recording medium.

2. U.S. Pat. No. 3,655,851 to Edwards et al. discloses the use of an electrically charged screen or stencil operating against an electrically charged mandrel or counter-electrode to transfer ink from the screen to the mandrel. (See FIGS. 7 and 9 and column 4, lines 18–29).

3. U.S. Pat. Nos. 3,289,211 and 3,375,528 describe ink recorders using a recording head which deposits ink in integral amounts to a desired medium.

SUMMARY OF THE INVENTION

It is, therefore, an object of the present invention to overcome the disadvantages of the prior art.

It is also an object of the present invention to mark a recording surface with a liquid ink responsive to electrical charge.

It is another object of the present invention to mark a recording surface with a liquid ink while avoiding the need for high electrical potentials across the recording surface.

These and other objects are accomplished by the method which comprises, generally, speaking, providing an electrically insulating screen; loading the openings in the screen in a meniscus configuration with a liquid ink; and positioning the screen adjacent a grounded conductive imaging surface. Electrical charge is delivered to the ink held in selected ones of the openings so that the charged ink is drawn into marking contact with the imaging surface by the attractive forces therebetween.

The apparatus for performing the method comprises, generally speaking, a screen formed from an electrically insulating material and having the openings therein loaded with a liquid ink in meniscus configuration. The screen is positioned adjacent a grounded conductive imaging surface. The apparatus further includes a means for delivering electrical charge to selected ones of the ink-loaded openings so that the charged ink is drawn into marking contact with the imaging surface by the attractive forces therebetween.

BRIEF DESCRIPTION OF THE DRAWINGS

The invention is described with reference to the drawings wherein.

DETAILED DESCRIPTION

Figure 1:
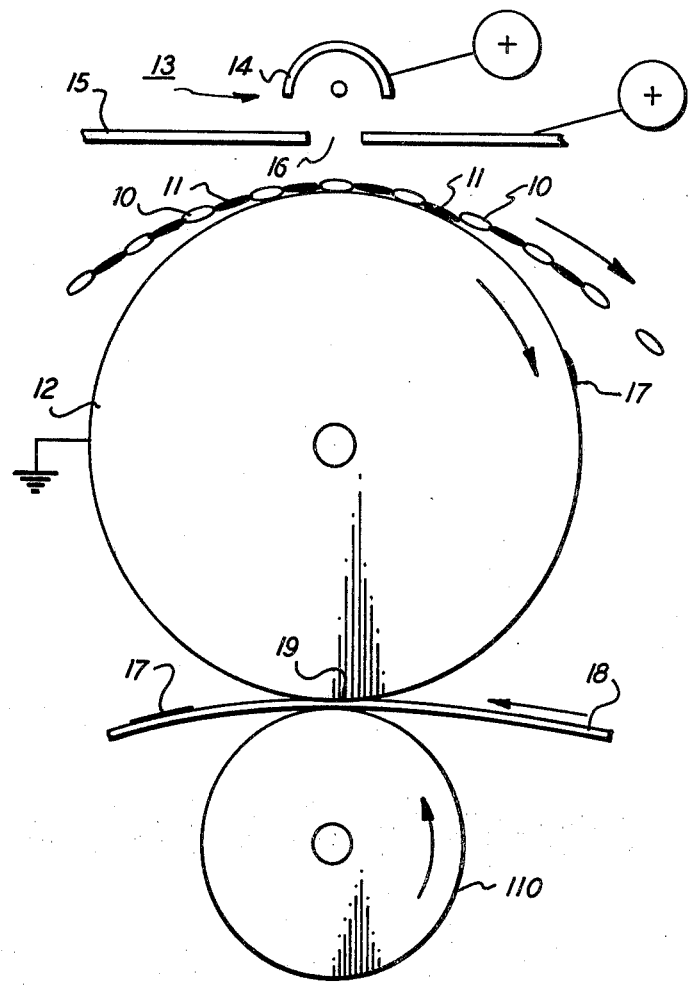
FIG. 1 shows schematically and in cross-section an embodiment of the present invention wherein charge is delivered by means of an ion control device.

Referring more specifically to FIG. 1, there is shown a screen 10 in which the openings are filled with liquid ink 11. The screen is positioned adjacent grounded conductive roll 12. The roll and the screen move in the direction indicated by the arrows.

Screen 10 has been loaded with ink 11 and doctored so that ink 11 fills screen 10 in meniscus configuration. The meniscus configuration allows screen 10 to contact roller 12 without transferring liquid ink 11 to roller 12 by such contact alone.

The means for delivering electrical charge to selected one of the ink-loaded openings is an ion control device, generally designated 13.

Ion control device 13 includes a corotron 14 and electrode 15. Electrode 15 has a slit 16 defining an aperture. Charge generated by corotron 14 is allowed to pass the aperture or is blocked from passing the aperture depending on the charge applied to electrode 15.

Charge which passes through slit 16 strikes ink 11 in selected ones of the openings in screen 10. Charged ink 11 is drawn into contact with roller 12 by the attractive forces therebetween to form image 17 on the surface of roller 12.

Image 17 can be transferred to a record medium 18, such as paper, if desired. A typical arrangement for such a transfer is shown in FIG. 1. Record medium 18 is moved in contact with roller 12 through a nip 19 between roller 12 and transfer roll 110. Roller 12 is a smooth conducting surface, preferably of resilient material to improve the final ink transfer to paper on other recording medium 18. The bulk resistivity of roller 12 should be less than about $10''$ ohm-cm to insure charge induction in the roller surface simultaneous with the application of charges to the inked screen 10, which may take place in 10 milliseconds or less. Roller 12 may consist of a number of materials such as a solid elastomeric material, an elastomer coating on a rigid metal roller, and the like. Image 17 is transferred to a record medium 18, as shown.

Ink 11 can be any suitable liquid ink. Ink 11 should be sufficiently dyed or pigmented to cause visible marking of the imaging surface.

Figure 2:
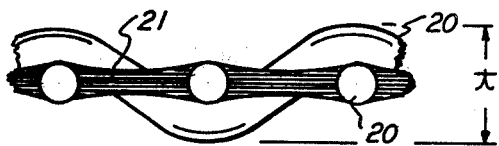
FIG. 2 shows schematically and in cross-section a greatly enlarged portion of a screen containing liquid ink.
Figure 3:
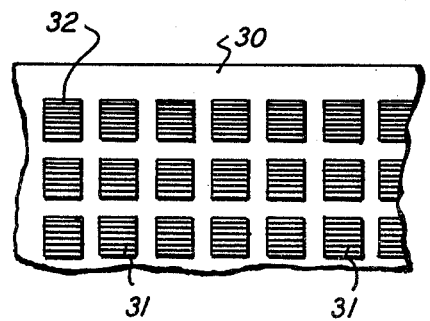
FIG. 3 is a greatly enlarged screen having electrically isolated openings.

The ink should be electrically insulating if the openings in screen 10 are not electrically isolated. However, if the openings in the screen are electrically isolated, the ink can be conductive. (Examples of screens suitable for insulating and conductive inks are shown in FIGS. 2 and 3).

Suitable inks can be, for example, well known fountain pen and printing inks. Also suitable are conductive and insulating inks used as liquid developers in xerography.

One useful conductive ink is described in U.S. Pat. No. 3,985,663 to Lu et al. fully incorporated herein by reference. That ink contains a coloring agent, a binder, a dispersant and a quaternary ammonium compound.

Another useful conductive ink is described by Lu in U.S. Pat. No. 3,907,694, fully incorporated herein by reference. That ink includes pigments or dyes in the high-boiling solvent carrier triethylene glycol monobutyl ether.

A useful ink containing a charge control agent is disclosed in U.S. Pat. No. 3,729,419 to Honjo et al.

Insulating inks generally have oil or oil-like vehicles so that the colored ink has a resistivity of from about $10^8$ to about $10^{14}$ ohm-cm. Typical vehicles include glycerol, polypropylene glycol, 2,5-hexanediol, mineral oil, the vegetable oils including castor oil, peanut oil, coconut oil, sunflower seed oil, corn oil, rapeseed oil, and sesame oil.

Also included are mineral spirits, fluorinated hydrocarbon oils such as du-Pont's Freon solvents and Krytox oils, silicone oils, fatty acid esters, kerosene, decane, toluene and oleic acid. In addition, as is well known in the art, such inks can contain one or more secondary vehicles, dispersants, pigments or dyes, viscosity controlling agents or additives which contribute to the drying or fixing of the ink.

The most commonly used colorant in useful inks is powdered carbon. However, almost any of the well known pigments and dyes can be used alone or in combination to achieve the desired color. Lists from which useful pigments and dyes can be selected are found in the CRC Handbook of Chemistry and Physics, 51st edition, published by the Chemical Rubber Co., Cleveland, Ohio 44128, at pages C-754-6 and F60-2.

Any suitable means is useful for delivering electrical charge to ink held in selected ones of the openings. The charge delivery means should be capable of quickly charging selected ones of the ink-filled openings sufficiently to move the ink without causing air breakdown.

Charges greater than about 400 v. can cause air breakdown when slow moving high viscosity inks are used. At least about 150 v. is generally required to cause the ink to transfer to the grounded imaging surface. However, higher and lower charges are sometimes useful, especially in cases where unusual ink viscosities are encountered, with the preferred charge being between about 200 and 300 volts.

The charge delivery means shown in FIG. 1 is an ion control device. Other charge delivery means are described in connection with FIGS. 4 and 5.

Referring more specifically to FIG. 2, there is shown in cross-section a greatly enlarged portion of a screen structure which is useful in the present invention. The screen is formed from filaments 20 which are woven together. The interstices between filaments 20 are filled in meniscus fashion with liquid ink 21.

Filaments 20 which comprise the screen may be formed from any suitable insulating material. Typically such materials include polymers, e.g. polyamides, and metal wires coated so as to be electrically insulating.

Thickness of the screen can be any suitable distance consistent with desired image resolution and screen strength. Distance can be as great as 0.003 or even 12.5 microns, although it more commonly ranges from about 15 to about 25 microns.

The filament frequency can also vary depending on the desired image resolution and density. High filament frequencies result in higher resolution, but also exhibit reduced density. This is because the high frequency of the filaments leaves little room in the interstices for ink.

A typical compromise between resolution and density is achieved by the use of filaments having a diameter of about 10 microns and a frequency of about 200 per inch.

Referring more specifically to FIG. 3, there is shown a screen embodiment for use with conductive inks. Screen 30 is formed from any suitable material. As discussed in connection with FIG. 2, the screen material should be electrically insulating. In most cases, it should be flexible so that it can conform to the general shape of the imaging surface at least during movement of the ink from the interstices to the surface.

Ink 31 is held in electrically insulating chambers which are openings passing from one surface of the screen to the other. The chambers shown are square; however, in practice they can be any suitable shape. The screen thickness and the frequency of the openings should be consistent with material strength, desired resolution and desired density. As described in connection with FIG. 2, increased resolution usually occurs at the expense of density.

Figure 4:
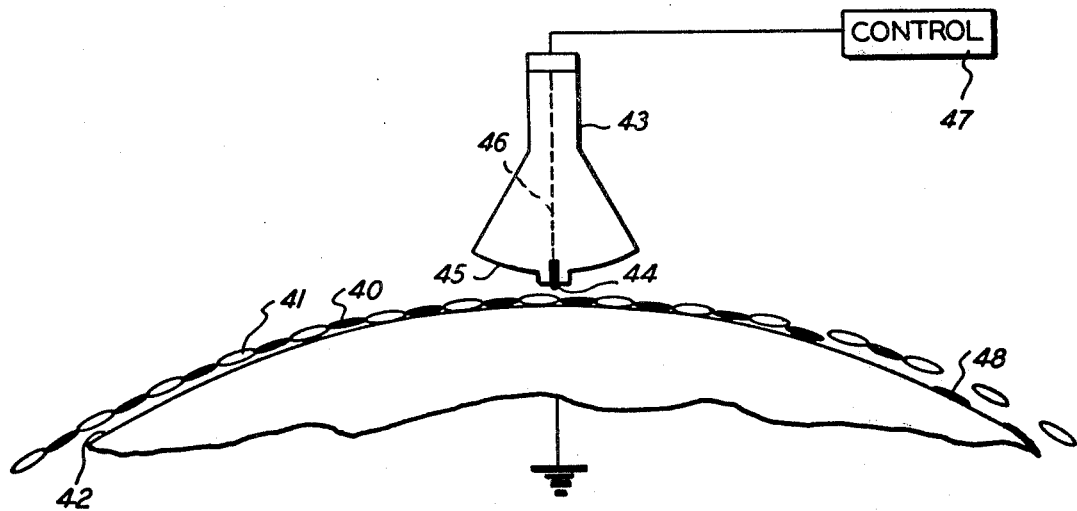
FIG. 4 shows schematically and in cross-section the apparatus of the present invention wherein the charge is delivered by a pin-tube.

Referring more specifically to FIG. 4, there is shown an embodiment of the present invention wherein the means for delivering charge to the ink is a pin tube.

Ink 40 is held in the interstices of screen 41. Screen 41 is positioned adjacent grounded conductive imaging surface 42.

Charge is delivered to ink 40 held in the interstices of screen 41 by pin tube 43. Pin tubes are well known in the art, and any suitable such tube may be used.

A pin tube is essentially a modified cathode ray tube. The photophorescent material normally found on the face of a cathode ray tube is substituted with a tightly-spaced pin matrix.

The face of the pin tube 43 is constructed with a single row 44 of fine wires or pins which penetrate tube face 45. The pins permit the current from cathode ray beam 46 to pass through the tube envelope. The length of row 44 of pins is substantially equal to the width of screen 41.

When beam 46 is directed upon a given pin by control 47, the pin will charge to the potential of the cathode. The pin delivers the charge to ink 40 held in screen 41.

Pin tubes suitable for use in the present invention are commercially available from DuPont, Sylvania, Raytheon and Litton. A more detailed discussion of pin tubes and their previously known uses can be found in the text *Xerography And Related Processes* by Dessauer and Clark, pages 444–450, published in 1965 by the Focal Press, London and New York.

Any suitable control means 47 can be used for directing beam 46 to selected ones of the pins in row 44. Such control units are typically optical scanners, computer output terminals, memory-recognition equipment, or the like.

The charge delivered to selected ones of the ink-filled interstices in screen 41 causes the ink at that location to be drawn to the grounded conductive imaging surface by the forces therebetween. Image 48 is formed.

Figure 5:
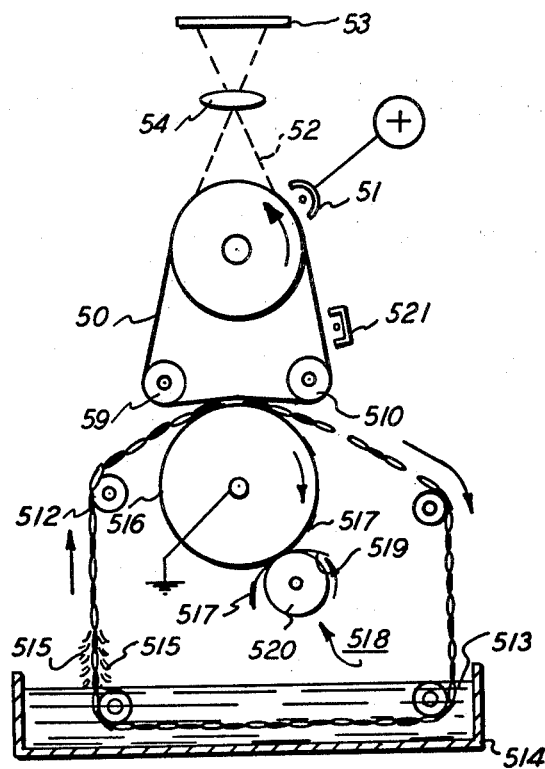
FIG. 5 shows schematically and in cross-section an apparatus according to the present invention wherein the charge is delivered by means of a TESI image.

Referring more specifically to FIG. 5, there is shown an embodiment of the present invention wherein the means for delivering charge to the screen is a TESI image. FIG. 5 also shows the additional step of transferring the image from the imaging surface to a record medium.

TESI is well known in the xerographic arts and refers to the transfer of electrostatic images. A detailed discussion of TESI can be found in *Xerography And Related Processes* referenced above at pages 423–437. Generally, speaking, TESI is the transfer of an electrostatic image from a photoreceptor surface on which it has been formed to an insulating surface.

In FIG. 5, belt photoreceptor 50 comprises a cylindrical conductive substrate coated with a photoconductive layer. Such photoreceptors are well known in xerography.

As belt photoreceptor 50 rotates in the direction indicated by the arrow, its surface is uniformly charged to one potential by corona device 51.

Next in sequence, belt 50 is exposed to a light image 52 reflected from original 53 through optical systems 54. The uniform charge is dissipated in the light-struck areas. The latent electrostatic image corresponding to the non-light struck areas remains on the photoconductor surface. After transfer, belt photoconductor 50 is flood exposed by lamp 521 to erase any of the electrostatic latent image remaining and to prepare it for subsequent revolutions. Between rollers 59 and 510, belt photoreceptor comes into contact with the inked screen 512.

Screen 512 can be similar to the screens described in FIG. 2 or 3. Screen 512 forms a closed loop and moves in a path which takes it through liquid ink 513 in reservoir 514.

Screen 512 is doctored by blades 515 as it emerges from ink 513 so that the ink remains in the screen openings in meniscus configuration.

Screen 512 moves in the direction shown by the arrow and is sandwiched between web 56 bearing an electrostatic image and grounded conductive imaging roller 516. It is important that inked screen 512 makes contact with the conductive roller 516 before the belt photoreceptor 50 comes into contact with the inked screen 512. Charge supplied to selected ones of the ink-filled openings in screen 512 by the electrostatic image causes the ink to move to imaging surface 516 by the attractive forces therebetween. The transferred ink forms image 517 on surface 516.

Image 517 is transferred to record medium 519, such as paper, at a transfer station generally designated 518. Record medium 519 is sandwiched between imaging surface 516 and transfer roller 520 as the rollers move in the direction shown by the arrows. Contact between peferably resilient roller 516 carrying image 517 and record medium 519 is sufficient to cause image 517 to transfer. It will be appreciated by those skilled in the art that various other well known transfer arrangements are useful, e.g. those employing heat, pressure and/or electrical bias to aid in the transfer.

The above description and drawings will be sufficient to enable one skilled in the art to make and use the present invention and to distinguish it from other inventions and from what is old. It will be appreciated that the other variations and modifications will occur to those skilled in the art upon reading the present disclosure. These are intended to be within the scope of this invention.

What is claimed is:

1. A method for marking a conductive imaging surface with a liquid ink, the method comprising:
   (a) providing an electrically insulating screen;
   (b) loading the openings in the screen with a liquid ink in a meniscus configuration;
   (c) positioning the screen adjacent a conductive imaging surface;
   (d) delivering charge to the ink held in selected openings so that the charged ink is drawn into marking contact with the conducting imaging surface by the attractive forces therebetween.

2. The method of claim 1 wherein the ink is electrically insulating.

3. The method of claim 1 wherein the openings provide electrically separate chambers and the ink is electrically conductive.

4. The method of claim 1 wherein the screen thickness ranges from about 15 microns to about 125 microns.

5. The method of claim 1 wherein the ink is charged to a potential from about 150 volts to about 400 volts.

6. The method of claim 1 wherein the charge is delivered by a pin tube.

7. The method of claim 1 wherein the charge is delivered by an electrically modulated aperture.

8. The method of claim 1 wherein the charge is delivered by means of a TESI process.

9. The method of claim 1 including the further step of transferring the ink from the imaging surface to a record member.

10. A method in accordance with claim 9 wherein a resilient transfer roller is used.

11. A method in accordance with claim 9 wherein the imaging surface is resilient.

12. An apparatus for marking a grounded conductive imaging surface with a liquid ink, the apparatus comprising:
   (a) a screen formed from an electrically insulating material and having the openings therein loaded with a liquid ink in meniscus configuration, the screen being positioned adjacent the imaging surface; and
   (b) a means for delivering electrical charge to selected ones of the ink-loaded openings so that the charged ink is drawn into marking contact with the imaging surface by the attractive forces therebetween.

13. The apparatus of claim 12 wherein the ink is electrically insulating.

14. The apparatus of claim 12 wherein the openings provide electrically separate chambers and the ink is electrically conductive.

15. The apparatus of claim 12 wherein the screen thickness ranges from about 15 microns to about 0.125 microns.

16. The apparatus of claim 12 wherein the means for delivering an electrical charge is capable of delivering a charge to the ink of from about 200 volts to about 300 volts.

17. The apparatus of claim 12 wherein the means for delivering an electrical charge is a pin tube.

18. The apparatus of claim 10 wherein the means for delivering an electrical charge is an electrically modulated aperture.

19. The apparatus of claim 12 wherein the means for delivering an electrical charge is a TESI process.

20. The apparatus of claim 12 adapted to include a means for loading the openings with liquid ink.

21. The apparatus of claim 20 wherein the means for loading includes a means for doctoring the openings.

22. The apparatus of claim 12 adapted to include a means for transferring the ink from the imaging surface to a record member.

23. The apparatus of claim 22 wherein the imaging surface is resilient.

* * * * *